3,380,938
PRESSURE-SENSITIVE ADHESIVE COMPRISING NATURAL RUBBER AND A STYRENE-METHYL METHACRYLATE-ETHYL ACRYLATE TERPOLYMER
James Jack, Mistley, Essex, and James Anthony Horrocks, Ipswich, Suffolk, England, assignors to B.X. Plastics Limited, London, England, a British company
No Drawing. Continuation-in-part of application Ser. No. 282,164, May 21, 1963. This application June 15, 1966, Ser. No. 557,609
2 Claims. (Cl. 260—4)

ABSTRACT OF THE DISCLOSURE

A pressure-sensitive adhesive for a polyolefin film comprising a natural rubber latex and an addition polymer latex, the weight of the solid addition polymer being in the range 20–80% of the solid material present and the addition polymer being capable of keying to a polyolefin film, being non-tacky and incompatible with natural rubber.

This application is a continuation-in-part of U.S. application Ser. No. 282,164, filed May 21, 1963. It relates to adhesive compositions. It particularly relates to pressure-sensitive adhesives based on natural rubber latices. By "a pressure-sensitive adhesive" is meant throughout the specification an adhesive which when applied to a surface adheres thereto to give a coating which does not adhere strongly to uncoated surfaces but does adhere to another similarly coated surface when the two surfaces are brought together under pressure. Such pressure-sensitive adhesives are well-known; for example the natural rubber latex based adhesives.

The present invention is a pressure-sensitive adhesive for a polyolefin thermoplastic film substrate which comprises an aqueous natural rubber latex, an addition polymer emulsion, said polymer being capable of keying to the substrate, being non-tacky and incompatible with natural rubber, and the weight of solid addition polymer being in the range 20 to 80% of the total solid material present.

In pressure-sensitive adhesives according to the present invention, the presence of the addition polymer, apart from controlling the tack of the adhesive, also increases the adhesion of the adhesive to the substrate and tends to prevent the rubber stretching when the bond is broken. By varying the ratio of natural rubber latex to addition polymer, it is possible to obtain a substantially non-tacky coating which seals under high pressure, such as that developed when the coated film is passed through crimp-rollers, to a relatively tacky coating which seals under low pressure. The weight of solid addition polymer present is in the range 20 to 80% of the total solid material present.

The addition polymer is capable of keying to the polyolefin thermoplastic film substrate, is non-tacky. i.e, dried coatings of the polymer do not form cohesive bonds when pressed together, and is incompatible with the natural rubber, i.e., is incapable of forming a homogeneous composition therewith.

The ability of an addition polymer to key to a substrate is most conveniently tested by mixing the addition polymer in aqueous emulsion form with a modified natural rubber latex as described hereafter in Example 2. The quantity of addition polymer emulsion added is such that the weight of polymer present is approximately equal to the weight of natural rubber present. The mixture thus produced is applied to a strip of the substrate one inch in width and allowed to dry to form an adhesive coating. Two such coatings are then sealed together by passing the strips through a crimp wheel device giving a pressure of between 300 and 400 lbs. per square inch. The strength of the bond is then determined by clamping one strip and attaching a scale pan to the other. 25 gram weights are then added to this pan at 10 second intervals. The total weight added when the bond parts is taken as the bond strength. If this is greater than 150 grams the addition polymer must have been capable of keying to the substrate.

Examples of suitable addition polymers are polymers, copolymers and terpolymers of esters of unsaturated acids containing 3 or 4 carbon atoms, e.g., an acrylate ester or a methacrylate ester, said esters preferably being derived from lower aliphatic alcohols (containing up to six carbon atoms). Specific examples are ethyl acrylate/methyl methacrylate/styrene terpolymers; acrylate ester/methacrylate ester copolymers; acrylate ester/styrene copolymers; polymethyl methacrylate and polybutyl acrylate. Preferred terpolymers can have a composition in the following weight range: styrene 52–44%, methyl methacrylate 27–41%, and ethyl acrylate 21–15%.

According to the present invention, preferred pressure-sensitive adhesives may be made up from a modified natural rubber latex having the following composition, the percentages quoted being by weight:

Natural rubber latex _____ 72.9–95.15%.
Thickening agent _____ 4.5–25%.
Antioxidant _____ 0.1–1%.
Wetting agent _____ 0.05–0.1%.
Foam suppressor _____ 0.2–1.0%.
Alkali _____ Sufficient to produce a pH value of 9.5–10.0.

Various thickening agents may be used such as alginates, soluble cellulose derivatives, e.g., carboxy methylcellulose and methyl cellulose, casein, ethylene oxide polymers and water soluble acrylate polymers. The thickening agent or agents is used together with added water (if necessary) to produce a liquid capable of working satisfactorily on various types of applicator machines, e.g., spray coaters, stencil machines and curtain coaters.

The adhesives may contain tackifying resins, e.g., terpene resins, but such are not essential components of the adhesives according to the present invention.

The tack of the adhesives according to the present invention can be reduced by the addition of antiblocking agents. Suitable proportions are up to 10% by weight of the solid content of the adhesive. Examples of such agents are polyethylene and paraffin and amide waxes.

The pressure used to press the surfaces to be sealed together with adhesives according to the present invention varies with the nature of the pressure-sensitive adhesive. The adhesive can be formulated so that very light pressures do not cause adhesion and thus accidental touching of coated surfaces will not cause seals to be formed. Adhesives can be formulated which will seal films under relatively light pressures, i.e., finger pressure, and which can be broken and remade several times. These adhesives are particularly useful in packaging applications where the packet has to be opened and resealed using finger pressure only.

The adhesives according to the present invention are particularly useful for use with a polyolefin thermoplastic film substrate, e.g., oriented film made from polypropylene having a high isotactic polypropylene content. Such films may readily be bonded together by means of the adhesive according to the present invention or to other substrates such as paper, aluminium foil or polystyrene film.

The bond strengths of adhesives according to the present invention are increased on polyolefin thermoplastic films by subjecting the surface of the film to corona discharge treatment. In the case of oriented polypropylene film the highest bond strengths are formed when the corona discharge treatment has been such that the treated surface is wetted by solutions having a surface tension of between 38 and 41 dynes per centimetre.

The following examples describe pressure sensitive adhesives according to the present invention.

EXAMPLE 1

A pressure adhesive formulation is prepared by mixing:

| | Parts by weight |
|---|---|
| 60% natural rubber latex | 65 |
| 60% sodium dioctyl sulphosuccinate | 0.08 |
| Casein (thickening agent) | 4.5 |
| A styrenated phenol sold under the trade name "Montaclere" | 0.4 |
| An aliphatic alcohol sold under the trade name "Bevaloid 581B" (anti-foaming agent) | 0.04 |
| Borax | 0.75 |
| Water | 22.50 |
| "Tenaxatex 3001 A" | 66.6 |

"Tenaxatex 3001 A" is a styrene/methyl methcrylate/ethyl acrylate terpolymer emulsion containing 10% of a polyethylene wax. Solids content is 59%. It is manufactured by H. A. Smith Ltd., Great Britain.

This adhesive is coated onto 50 guage biaxially oriented polypropylene film using an air knife coating technique to give a coating of 0.0003 inch thickness. The adhesive is dried at 130° C. in hot air to give a substantially clear coating. This coating can be sealed to itself using high pressure, preferably that provided by a crimp wheel device. When the bond is broken the rubber in the coating breaks off short, i.e., it does not stretch; this is due to the terpolymer. The coating was substantially non-blocking as shown by the fact that a piece of coated film did not stick to an uncoated sample, when placed under a 500 gm. weight for 24 hrs. at 30° C. By reducing the amount of terpolymer present in the mixture within the range 20 to 80% of the total solid material present a tackier coating can be obtained which seals under low pressure, i.e., just by touching two coated surfaces together.

The terpolymer is capable of keying to biaxially oriented polypropylene film and is non-tacky. It is also incompatible with natural rubber as can be demonstrated by the following procedure:

Two microscopic slides were coated with films (0.003 inch in thickness) of the adhesive described above and allowed to dry in air at 60° C. The two films were then coated with glycerine and the slides placed together with the coated surfaces together. The degree of haze caused by the two films was then measured by a standard optical technique. The above procedure was then repeated but in this case one slide was coated with a composition corresponding to the adhesive from which the addition polymer emulsion had been removed and the other with the addition polymer emulsion on its own. The degree of haze was again measured. It was found that the degree of haze was greater in the films made from the adhesive composition, thus demonstrating that the terpolymer was incompatible with the natural rubber.

This testing procedure is a convenient one to employ when the addition polymer has a refractive index different from that of natural rubber and a particle size sufficient to be detected by the optical technique employed.

EXAMPLE 2

A modified natural rubber latex was prepared having the composition:

| | Parts by weight |
|---|---|
| 60% natural rubber latex | 65.0 |
| Ammonium hydroxide (.880) | 0.8 |
| A styrenated phenol sold under the trade name Montaclere (Monsanto) | 0.4 |
| 60% sodium dioctyl sulphosuccinate | 0.08 |
| An aliphatic alcohol sold under the trade name "Bevaloid 581B" (anti-foaming agent) | 0.04 |
| Casein | 4.5 |
| Borax | 0.75 |
| Water | 22.50 |
| Sodium orthophenyl phenate | 0.25 |

To 60 parts by weight of this was added 40 parts by weight of a terpolymer of ethyl acrylate/methyl methacrylate/styrene containing 10% of a polyethylene wax, which is sold under the trade name Tenaxatex 3001/A.

The adhesive thus produced was applied to a film of isotactic polypropylene which had been treated by a corona discharge to give a wet adhesive coating of 0.0015 inch thickness. The film was dried at 80° C. in a stream of air and reeled onto a 1" diameter cardboard core to give a substantially clear coat. The coating was sealed to itself under a pressure in the range 300–400 lbs./sq. in. by passing through a crimp wheel device. The bond gave a peel strength of 275 grams per inch. The coating was substantially non-blocking.

EXAMPLE 3

| | Parts by weight |
|---|---|
| The modified natural rubber latex described in Example 2 | 45 |
| Texicryl AS 530 | 55 |
| Parncol 404C | 2 |

Parncol 404C is described as a microcrystalline wax and is made by the Hercules Powder Company. Texicryl AS 530 is a butyl acrylate homopolymer emulsion manufactured by Scott-Bader Ltd., containing 50% by weight of polymer. The polymer was incompatible with natural rubber, non-tacky and capable of keying to polypropylene film.

Tested as described in Example 2 the adhesive gave a peel bond strength of 275 grams per inch. The coating was relatively clear and non-blocking.

EXAMPLE 4

| | Parts by weight |
|---|---|
| The modified natural rubber latex described in Example 2 | 75 |
| Vinamul N.300 | 37.5 |

Vinamul N.300 is a polymethyl methacrylate emulsion manufactured by Vinyl Products Ltd., Great Britain, containing 50% by weight of polymer. The polymethyl methacrylate is incompatible with rubber, non-tacky and capable of keying to isotactic polypropylene film. Tested as described in Example 2 the adhesive gave a peel bond strength of 300 grams per inch. The coating was completely non-blocking but opaque.

EXAMPLE 5

| | Parts by weight |
|---|---|
| The modified natural rubber latex described in Example 2 | 25 |
| Tenaxatex AM–278 | 75 |
| Dribrite | 5 |

Tenaxatex AM–278 is an acrylate/methacrylate copolymer emulsion manufactured by H. A. Smith Ltd., containing 50% by weight of copolymer. The copolymer is incompatible with rubber, non-tacky and capable of keying to isotactic polypropylene.

Tested as described in Example 2 the adhesive gave a peel bond strength of 350 grams per inch. The coating was substantially non-blocking and clear.

By way of comparison with Examples 2 to 5, the modified natural rubber latex described in Example 2 gave the following results. When coated onto the polypropylene film the dried rubber has very poor keying to the substrate, also reels wound from this coated film block badly. The bad keying can be demonstrated by forming a rubber to rubber bond. When this is parted the rubber is removed from the substrate.

We claim:

1. A pressure-sensitive adhesive for a polyolefin thermoplastic film substrate which comprises an aqueous natural rubber latex and a terpolymer having a composition in the following weight range: styrene 52–44%, methyl methacrylate 27–41%, ethyl acrylate 21–15%, the weight of terpolymer being in the range 20–80% of the total solid material present.

2. A pressure-sensitive adhesive according to claim 1 wherein apart from the terpolymer the adhesive has the following composition, the percentages quoted being by weight:

| | |
|---|---|
| Natural rubber latex | 72.9–95.15%. |
| Thickening agent | 4.5–25%. |
| Antioxidant | 0.1 to 1%. |
| Wetting agent | 0.5 to 0.1%. |
| Foam suppressor | 0.2 to 1.0%. |
| Alkali | Sufficient to produce pH value of 9.5 to 10.0. |

References Cited

UNITED STATES PATENTS

| | | | |
|---|---|---|---|
| 2,963,452 | 12/1960 | Sinn et al. | 260—4 |
| 3,230,186 | 1/1966 | Kreibich | 260—4 |
| 2,929,795 | 3/1960 | Reid et al. | 260—4 |
| 3,092,250 | 8/1960 | Knutson | 260—888 |
| 3,154,430 | 10/1964 | Goodloe et al. | 260—4 |

FOREIGN PATENTS 874,240  8/1961  Great Britain.

MURRAY TILLMAN, *Primary Examiner.*

M. J. TULLY, *Assistant Examiner.*